United States Patent
Peng et al.

(10) Patent No.: US 11,663,050 B2
(45) Date of Patent: May 30, 2023

(54) METHOD, DEVICE AND COMPUTER PROGRAM PRODUCT FOR MANAGING DEDICATED PROCESSING RESOURCES

(71) Applicant: EMC IP Holding Company LLC, Hopkinton, MA (US)

(72) Inventors: Layne Lin Peng, Shanghai (CN); Junping Zhao, Beijing (CN); Wei Cui, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 962 days.

(21) Appl. No.: 16/384,209

(22) Filed: Apr. 15, 2019

(65) Prior Publication Data

US 2019/0324821 A1 Oct. 24, 2019
US 2019/0324821 A1 Oct. 24, 2019

(30) Foreign Application Priority Data

Apr. 20, 2018 (CN) .......................... 201810359545.X (51) Int. Cl.
G06F 9/50 (2006.01)
G06T 1/60 (2006.01)
H04L 67/01 (2022.01)

(52) U.S. Cl.
CPC ............ *G06F 9/5077* (2013.01); *G06F 9/505* (2013.01); *G06F 9/5044* (2013.01); *G06T 1/60* (2013.01); *H04L 67/01* (2022.05)

(58) Field of Classification Search
CPC ...... G06F 9/5077; G06F 9/5044; G06F 9/505; H04L 67/01; G06T 1/60
(Continued)

(56) References Cited

U.S. PATENT DOCUMENTS 8,874,457 B2* 10/2014 Biran ................. G06Q 10/0637
718/1
9,229,850 B1* 1/2016 Wang .................... G06F 3/0689
(Continued)

FOREIGN PATENT DOCUMENTS

CN 104954400 A 9/2015
CN 105162716 A 12/2015
(Continued)

OTHER PUBLICATIONS

T. Paikeday, "Seven Service Providers Delivering the GPU-Accelerated Cloud—Built on NVIDIA GRID," https://blogs.nvidia.com/blog/2016/09/27/the-gpu-accelerated-cloud/, Sep. 27, 2016, 4 pages.
(Continued)

*Primary Examiner* — Chat C Do
*Assistant Examiner* — Bradford F Wheaton
(74) *Attorney, Agent, or Firm* — Ryan, Mason & Lewis, LLP (57) ABSTRACT

A resource management method comprises: in response to receiving, from an application operating on a client, a resource allocation request indicating an amount of dedicated processing resources required by the application, acquiring a mapping between a group of physical dedicated processing resources provided by a group of servers and a group of logical dedicated processing resources, the group of physical dedicated processing resources being divided into the group of logical dedicated processing resources; determining allocation statuses of the group of logical dedicated processing resources; determining, based at least on the mapping and the allocation statuses, a first amount of logical dedicated processing resources to be allocated to the application from the group of logical dedicated processing resources; and indicating the first amount of logical dedi-
(Continued)

cated processing resources to the application, to allow the application to utilize physical dedicated processing resources provided by at least one of the group of servers.

20 Claims, 6 Drawing Sheets

(58) Field of Classification Search
USPC .......................................................... 718/104
See application file for complete search history.

(56) References Cited

U.S. PATENT DOCUMENTS

| | | | |
|---|---|---|---|
| 2008/0232400 A1* | 9/2008 | Tsai | ........................ H04L 27/00 370/468 |
| 2012/0069032 A1 | 3/2012 | Hansson et al. | |
| 2012/0174114 A1* | 7/2012 | Matsumoto | ......... G06F 11/3423 718/104 |
| 2013/0003559 A1* | 1/2013 | Matthews | ........... H04L 43/0876 370/241 |
| 2016/0232640 A1* | 8/2016 | Zhao | ......................... G06F 9/50 |
| 2017/0047041 A1 | 2/2017 | Wilt et al. | |
| 2018/0152381 A1* | 5/2018 | Liu | ..................... H04L 41/5054 |

FOREIGN PATENT DOCUMENTS

| | | |
|---|---|---|
| CN | 105843683 A | 8/2016 |
| CN | 105988874 A | 10/2016 |

OTHER PUBLICATIONS

Amazon Web Services, Inc. "Linux Accelerated Computing Instances," Amazon Elastic Compute Cloud: User Guide for Linux Instances, https://docs.aws.amazon.com/AWSEC2/latest/UserGuide/accelerated-computing-instances.html, 2019, pp. 225-230.

T. Trader, "Microsoft Puts GPU Boosters on Azure Cloud," https://www.hpcwire.com/2015/09/29/microsoft-puts-gpu-boosters-on-azure-cloud/, Sep. 29, 2015, 21 pages.

G. Fan, "Research and Implementation of GPU Virtualization Methods in High-performance Clouds," Master Thesis in Engineering, Jiangsu University of Science and Technology, Mar. 2016, https://cmfd.cnki.net/dejournals/#/cmfd/article/2017/03/third/IIIM/after, 1138-5929, 38 pages. English Abstract Only.

* cited by examiner

METHOD, DEVICE AND COMPUTER PROGRAM PRODUCT FOR MANAGING DEDICATED PROCESSING RESOURCES

RELATED APPLICATION(S)

The present application claims priority to Chinese Patent Application No. 201810359545.X, filed Apr. 20, 2018, and entitled "Method, Device and Computer Program Product for Managing Dedicated Processing Resources," which is incorporated by reference herein in its entirety.

FIELD

Embodiments of the present disclosure generally relate to the field of cloud computing, and more specifically, to a method, a device and a computer program product for managing dedicated processing resources.

BACKGROUND

Applications on a client can be designed to complete a variety of processing or analysis tasks using computing resources, such as, processing resources and/or storage resources. As the requirement and complexity of tasks, such as machine learning, deep learning, data mining and the like, are constantly growing, a large amount of and/or scalable computing resources are required for operations of corresponding applications. This can be implemented by a machine or a system having a plurality of dedicated processing resources, where an application can be scheduled to operate over one or more of the dedicated processing resources of the machine or system. For example, a cloud-based computing system has already been developed, which includes a machine having one or more dedicated processing resources. Different clients can rent computing resources (e.g., dedicated processing resources) of the system to operate their respective applications as needed.

With continual improvement in computing capability of dedicated processing resources, how to more reasonably exploit the dedicated processing resources is a case worthy of study.

SUMMARY

Embodiments of the present disclosure provide a method, a device and a computer program product for managing dedicated processing resources.

In a first aspect of the present disclosure, there is provided a method for managing dedicated processing resources. The method comprises in response to receiving, from an application operating on a client, a resource allocation request indicating an amount of dedicated processing resources required by the application, acquiring a mapping between a group of physical dedicated processing resources provided by a group of servers and a group of logical dedicated processing resources, the group of physical dedicated processing resources being divided into the group of logical dedicated processing resources. The method also comprises determining allocation statuses of the group of logical dedicated processing resources. The method further comprises determining, based at least on the mapping and the allocation statuses, a first amount of logical dedicated processing resources to be allocated to the application from the group of logical dedicated processing resources, the first amount of logical dedicated processing resources meeting the amount of dedicated processing resources. Further, the method also comprises indicating the first amount of logical dedicated processing resources to the application, to allow the application to utilize physical dedicated processing resources provided by at least one of the group of servers, the physical dedicated processing resources corresponding to the first amount of logical dedicated processing resources.

In a second aspect of the present disclosure, there is provided a device for managing dedicated processing resources. The device comprises at least one processing unit and at least one memory. The at least one memory is coupled to the at least one processing unit and stores instructions executed by the at least one processing unit. The instructions, when executed by the at least one processing unit, cause the device to perform actions comprising: in response to receiving, from an application operating on a client, a resource allocation request indicating an amount of dedicated processing resources required by the application, acquiring a mapping between a group of physical dedicated processing resources provided by a group of servers and a group of logical dedicated processing resources, the group of physical dedicated processing resources being divided into the group of logical dedicated processing resources; determining allocation statuses of the group of logical dedicated processing resources; determining, based at least on the mapping and the allocation statuses, a first amount of logical dedicated processing resources to be allocated to the application from the group of logical dedicated processing resources, the first amount of logical dedicated processing resources meeting the amount of dedicated processing resources; and indicating the first amount of logical dedicated processing resources to the application, to allow the application to utilize physical dedicated processing resources provided by at least one of the group of servers, the physical dedicated processing resources corresponding to the first amount of logical dedicated processing resources.

In a third aspect of the present disclosure, there is provided a computer program product. The computer program product is tangibly stored in a non-transient computer storage medium and includes machine-executable instructions. The machine-executable instructions, when executed by a device, cause the device to perform any step of the method according to the first aspect of the present disclosure.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent through the more detailed description of the example embodiments of the present disclosure with reference to the accompanying drawings, wherein the same reference sign generally refers to the like element in the example embodiments of the present disclosure.

Throughout the drawings, the same or corresponding symbols represent the same or corresponding components.

DETAILED DESCRIPTION

The preferred embodiments of the present disclosure will be described in more detail with reference to the drawings. Although the preferred embodiments of the present disclosure are illustrated in the drawings, it should be understood that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one other embodiment." The terms "first", "second" and so on can refer to same or different objects. The following text can also include other explicit and implicit definitions.

As described above, dedicated processing resources may be provided locally at a client or by a remote machine or system. In some examples, a cloud-based computing system can be deployed, which includes a plurality of machines having one or more dedicated processing resources. The dedicated processing resources of the computing system can be utilized by different clients in accordance with needs, to schedule a corresponding application on available dedicated processing resources for operation.

Figure 1:
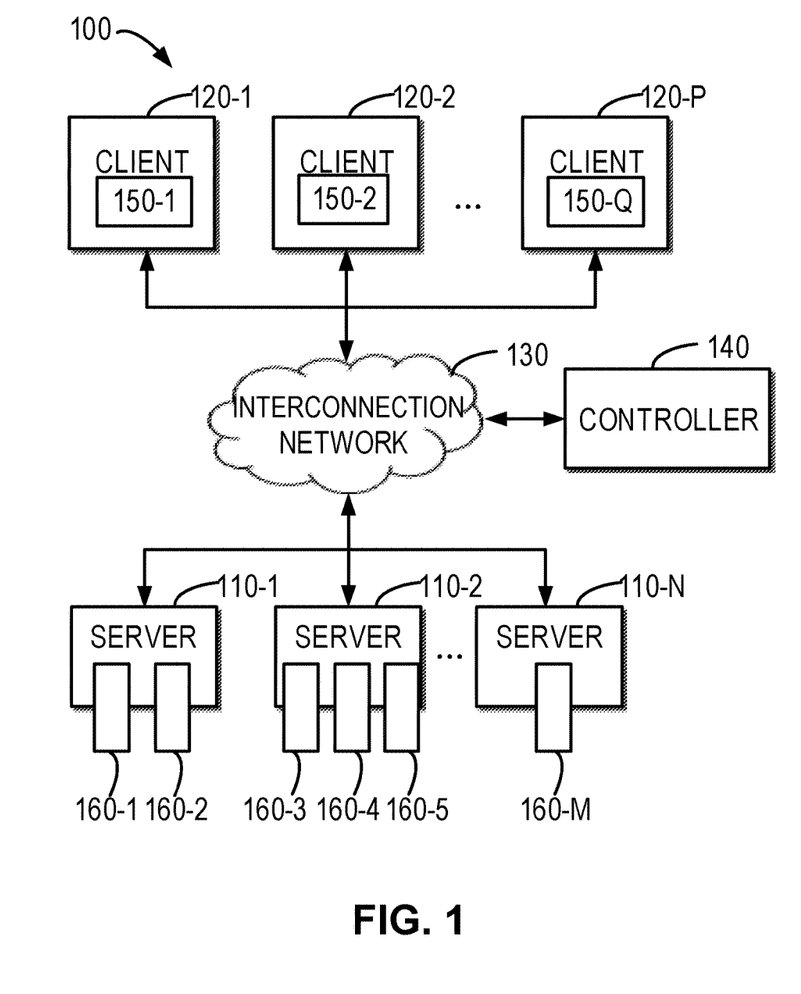
FIG. 1 illustrates a schematic diagram of an example environment in which some embodiments of the present disclosure can be performed.

FIG. 1 illustrates a schematic diagram of an example environment 100 in which embodiments of the present disclosure can be performed. It should be understood that the structure and function of the example environment 100 are described only for the purpose of illustration, without suggesting any limitations to the scope of the present disclosure. Embodiments of the present disclosure can also be implemented in the environments having different structures and/or functions.

As shown in FIG. 1, a plurality of servers 110-1, 110-2, . . . , 110-N (hereinafter individually or collectively referred to as server(s) 110, where N is a natural number) are deployed for providing dedicated processing resources to applications in the environment 100. The server 100 can be a physical or virtual machine. For example, the server 110 can be logic, a container or a virtual machine deployed in a data center or a private or public cloud, or a physical server or computing device and the like.

A plurality of dedicated processing resources 160-1, 160-2, . . . , 160-M (hereinafter individually or collectively referred to as dedicated processing resource(s) 160, where M is a natural number) can be distributed on a plurality of servers 110. For example, in the example shown by FIG. 1, the server 110-1 has two dedicated processing resources 160 (i.e., dedicated processing resource 160-1 and dedicated processing resource 160-2), the server 110-2 has three dedicated processing resources 160 (i.e., dedicated processing resource 160-3, dedicated processing resource 160-4 and dedicated processing resource 160-5), and the server 110-N has one dedicated processing resource 160 (i.e., dedicated processing resource 160-M). A "dedicated processing resource" stated here refers to a processing resource for a particular purpose. Examples of the dedicated processing resources 160 can include but are not limited to a Graphics Processing Unit (GPU), Field Programmable Gate Array (FPGA) and the like.

As shown in FIG. 1, a plurality of clients 120-1, 120-2, . . . , 120-P (hereinafter collectively or individually referred to as client(s) 120, where P is a natural number) are also deployed in the environment 100, which have respective running applications 150-1, 150-2, . . . , 150-Q (hereinafter individually or collectively referred to as application(s) 150, where Q is a natural number). The application 150 can be any application operated on a machine and can be designed to execute tasks, such as corresponding data processing or analysis and the like. As an example, the application 150 can execute data processing or analysis tasks related to High Performance Computing (HPC), Machine Learning (ML) or Deep Learning (DL) and Artificial Intelligence (AI) etc.

In order to rapidly and effectively operate these applications and/or reserve local processing resources, the client 120 can request the dedicated processing resource 160 in the server 110 to operate the applications 150. As shown in FIG. 1, the client 120, server 110 and controller 140 can be interconnected via an interconnection network 130. The controller 140 can be configured to allocate the dedicated processing resource 160 in the server 110 to the application 150 in the client 120. The controller 140, although shown separately in FIG. 1, can be implemented by other devices independent of the server 110, or can be partially or fully implemented on one or more servers 110 in practice. The interconnection network 130 can support, dependent on interfaces supported by the client 120, the server 110, the controller 140 and/or the dedicated processing resource 160, different types of wired or wireless connections based on a variety of network transmission technologies, such as Remote Direct Memory Access (RDMA) or Transmission Control Protocol (TCP) and the like.

In traditional solutions, dedicated processing resources are usually allocated based on the physical dedicated resources. For example, GPU, as a dedicated processor, has a strong computing capability due to its large amount of cores and high-bandwidth memory. In the hardware architecture of GPU, one GPU normally can have a large amount of GPU cores, e.g., 5120 or even up to 10000 cores. The capacity of the memory on the GPU is usually small, such as 8 GB-16 GB (gigabytes), but the bandwidth thereof is extremely high, for example, reaching 900 GB/s (gigabytes per second). However, in traditional solutions, the schedule of GPUs is normally based on physical GPUs. That is, a single GPU is usually occupied by a single application exclusively, which is wasteful because a large amount of GPU cores and high bandwidth in the single GPU cannot be fully exploited. Therefore, it is expected that GPU scheduling in a finer granularity will be realized to allow sharing of the same physical GPU among a plurality of applications that require a GPU for acceleration.

Example embodiments of the present disclosure provide a solution for managing dedicated processing resources. The solution can realize the scheduling of the dedicated processing resources in a finer grain. This solution can perform flexible configuration and management of the logical dedicated processing resources by dividing the physical dedicated processing resources into logical dedicated processing resources and scheduling the logical dedicated processing resources.

For the purpose of illustration, the following text will use GPU as an example of the dedicated processing resource. However, it should be understood that GPU only serves as an exemplary dedicated processing resource and is not intended for restricting the scope of the present disclosure. The spirit and principle described here can be applied to any other dedicated processors currently known or to be developed in the future, for example, accelerators such as FPGAs and the like.

Figure 2:
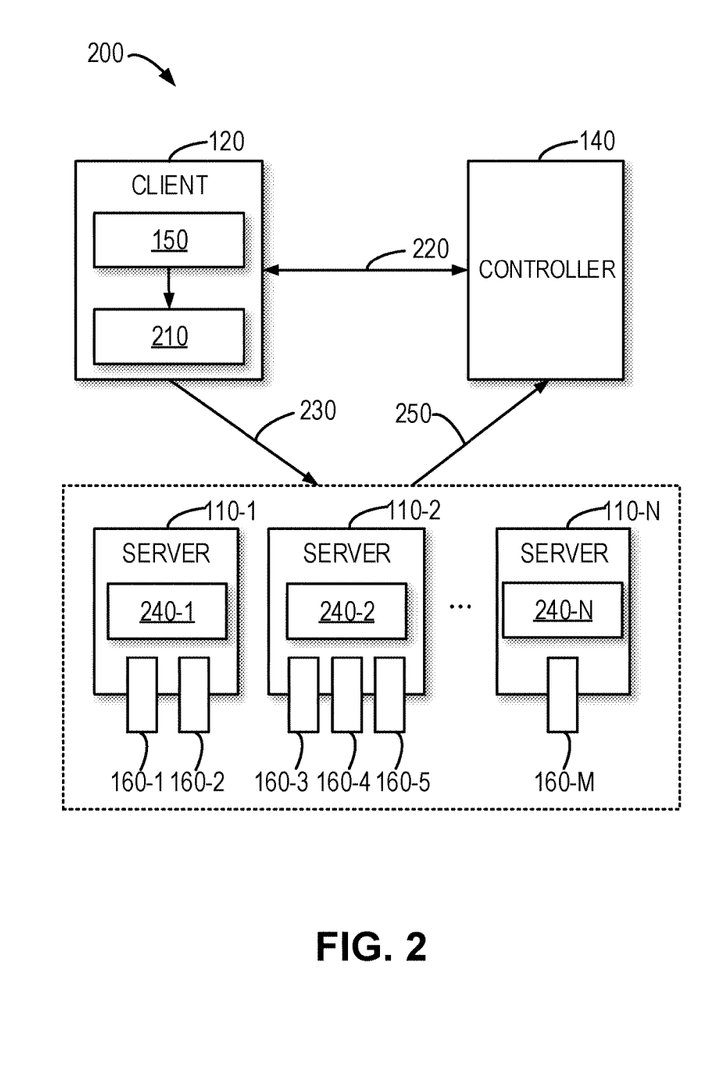
FIG. 2 illustrates a block diagram of an example system according to some embodiments of the present disclosure.

FIG. 2 illustrates a block diagram of an example system 200 according to some embodiments of the present disclosure. The system 200 can be considered as an example implementation of the environment 100 shown in FIG. 1. As shown in FIG. 2, the system 200 includes a client 120, a controller 140 and a plurality of servers 110 that provides a plurality of GPUs 160 as shown in FIG. 1. In the text, the plurality of servers 110 that provides a plurality of GPUs 160 is also known as "GPU cluster." It should be understood that the structure and function of the example system 200 are described for the purpose of illustration, without suggesting any limitations to the scope of the present disclosure.

As shown in FIG. 2, a client driver 210 is operating in the client 120, which client driver is internally loaded by the application 150 and operates on the same client node as the application 150. When the application 150 is operating, the client driver 210 can collect resource demands from the application 150. For example, the resource demand can be collected by automatic estimation (e.g., deep learning) or user's input. The collected resource demand, for example, can indicate an amount of GPU resources required by the application 150. The resource demand can be transmitted to the controller 140 via a scheduling path 220 between the client 120 and the controller 140, to request the controller 140 to allocate corresponding dedicated processing resources. The controller 140 can allocate the required GPU resources to the application 150 in response to receiving the resource allocation request. Upon receiving an indication of the allocated GPU from the controller 140, the client driver 210 can connect via a data path 230 between the client 120 and the server 110 to one or more of the servers 110, so as to accelerate the application 150 with the GPU provided by the one or more of the servers 110.

Respective server drivers 240-1, 240-2, . . . , 240-N (hereinafter individually or collectively referred to as server driver(s) 240) can operate in the plurality of servers 110. The server driver 240 can process a GPU connection request from the client driver 210, to provide corresponding GPU resources for the application 150. Particularly, in some embodiments, the server driver 240 can also be configured to execute a predetermined GPU restriction strategy for the application 150, to implement a fair use of GPUs among different applications. Additionally, the server driver 240 can also collect the hardware configuration information and system operating status information of the corresponding pGPU (physical GPU) and the like, and provide them to the controller 140 via a monitoring path 250 between the controller 140 and the server 110.

The controller 140 can be configured to divide the plurality of pGPUs 160 provided by the server 110 into logic GPUs (also known as "virtual GPUs," vGPUs), and the GPU resources are allocated to the application 150 in the unit of vGPU. The "vGPU" stated here denotes a logic representation of a finer-grained partition of a pGPU. In some embodiments, vGPU can be represented by an absolute amount of computing resources and storage resources, e.g., <100 GFlops, 2 GB GPU memory>, where "Flops" refers to floating point operations per second. In some other embodiments, vGPU can be represented in a form of a resource percentage relative to one pGPU, e.g., <25% GPU cores, 25% GPU memory>. It should be understood that one vGPU can originate from only one pGPU or from a plurality of pGPUs. In some embodiments, specifications of the vGPU (e.g., the amount of computing resources and storage resources included in each vGPU and the like) can be pre-defined. The controller 140 can acquire the hardware configuration information of different pGPUs via the monitoring path 250 between the controller 140 and the server 110, and divide the plurality of pGPUs into a plurality of vGPUs based on the acquired hardware configuration information of the pGPU and the predefined specifications of vGPU.

The controller 140 can further maintain a mapping between a plurality of pGPUs and a plurality of vGPUs in a mapping table. For example, the mapping table can be stored locally in the controller 140 or in another storage device accessible by the controller 140. The mapping table, for instance, can include a plurality of entries and each of them may include an index of vGPU, an index of pGPU to which the vGPU belongs and an identifier of the server 110 where the pGPU is located. Table 1 illustrates an example of a mapping table that records the mapping between a plurality of pGPUs and a plurality of vGPUs according to some embodiments of the present disclosure.

TABLE 1

Example mapping table recording a mapping between a plurality of pGPUs and a plurality of vGPUs vGPU1, server 110-1, pGPU 160-1
vGPU2, server 110-1, pGPU 160-2
vGPU3, server 110-2, pGPU 160-3
vGPU4, server 110-2, pGPU 160-4
. . .

Figure 3:
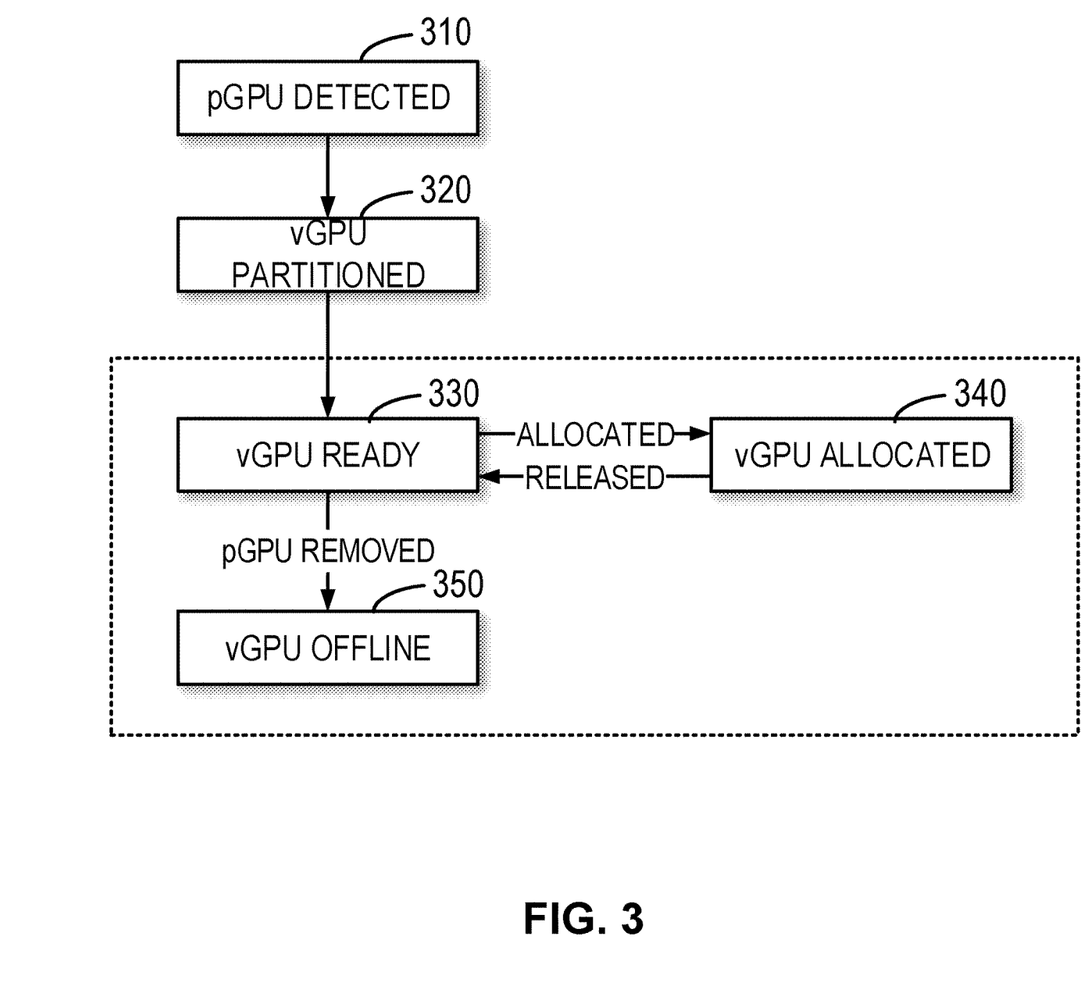
FIG. 3 illustrates a schematic diagram of a lifecycle of a virtual GPU according to some embodiments of the present disclosure.

Moreover, the controller 140 can manage the lifecycle of the divided vGPU. FIG. 3 illustrates a schematic diagram of the lifecycle of the vGPU according to some embodiments of the present disclosure. The lifecycle management of the vGPU by the controller 140 will be described in detail below with reference to FIGS. 2 and 3.

As shown in FIG. 3, when a new GPU server and/or a new pGPU is added into the system 200 shown by FIG. 2, a corresponding server driver will detect the new pGPU and report the information to the controller 140. The new pGPU is therefore in a detected status 310. The controller 140 can divide the new pGPU into vGPUs based on the acquired hardware specifications of the pGPU and the predefined specifications of the vGPUs. As such, the vGPUs are in a divided status 320. A mapping between the pGPU and the divided vGPUs can be recorded in the mapping table shown in Table 1, and the statuses of the vGPUs are changed to a ready status 330. When the controller 140 receives a resource allocation request from the client 120, the controller 140 can allocate the vGPUs based on the predetermined allocation strategy. For example, the vGPUs in the ready status can be allocated and their statuses are therefore changed to an allocated status 340. Once the operation of the application 150 is over, the vGPU allocated to the application 150 can be released, so that the vGPU can return to the ready status from the allocated status. When the pGPU is removed from the system 200, the status of one or more vGPUs corresponding to the pGPU is changed to an offline status 350.

Figure 4:
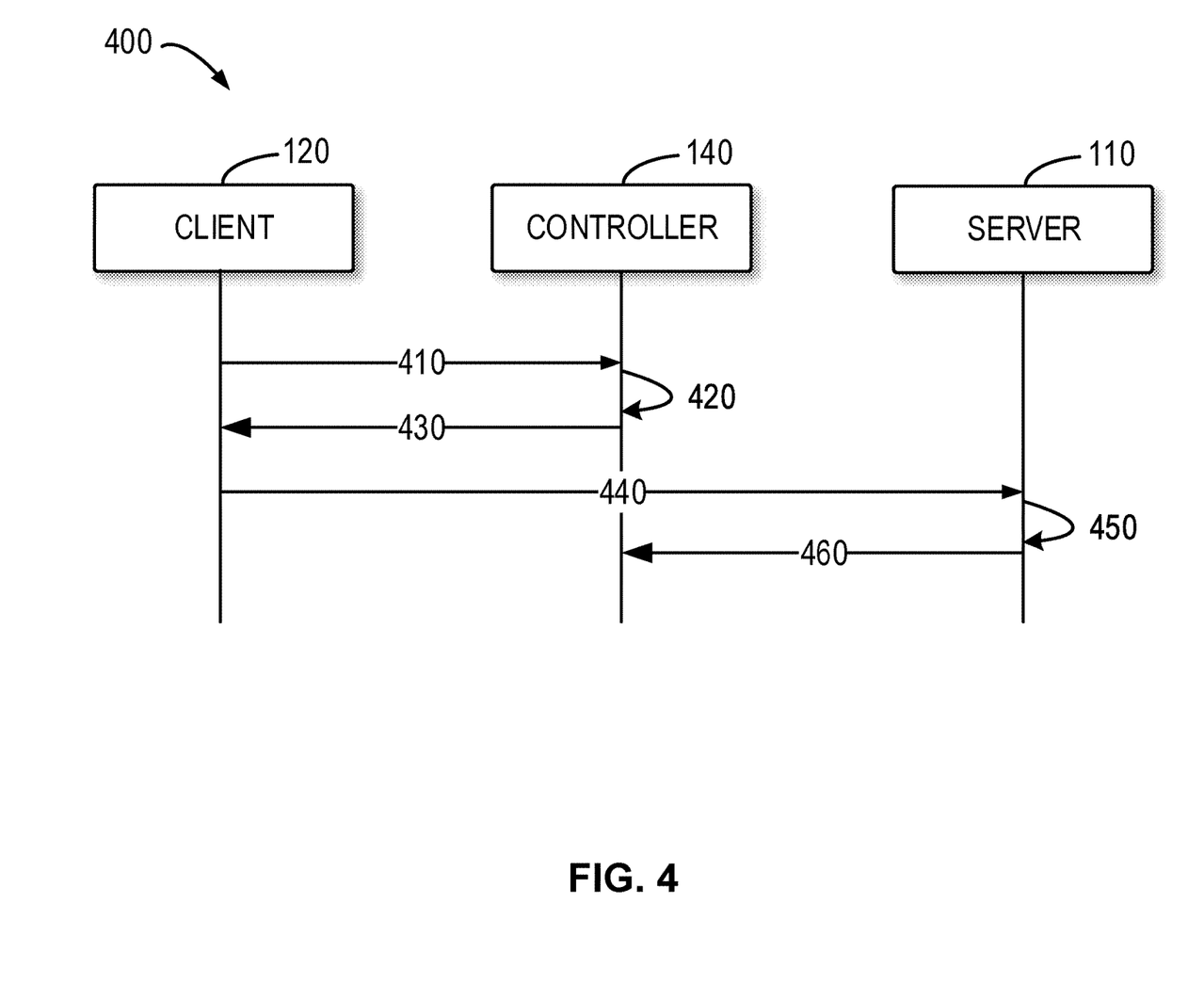
FIG. 4 illustrates a flowchart of an example procedure for managing dedicated processing resources according to some embodiments of the present disclosure.

FIG. 4 illustrates a flowchart of an example process 400 for managing dedicated processing resources according to some embodiments of the present disclosure. For the purpose of illustration, the process 400 in FIG. 4 will be described with reference to the client 120, the controller 140 and the server 110 shown in FIG. 2. It should be understood that the procedure 400 also can include additional actions not shown and/or omit some shown actions, and the scope of the present disclosure is not limited in this regard.

When an application 150 in the client 120 is activated, a client driver 210 corresponding to the application 150 can be loaded to collect resource demands from the application 150. In some embodiments, the resource demands can be collected in two manners. One manner is to collect a resource demand from a user's input. For example, the user may have already known the predefined specifications of vGPUs of the system and estimated the amount of required vGPUs based on the vGPU specifications; alternatively, the user can directly input the amount of computing resources and storage resources of the required GPU (e.g., an absolute amount or a relative amount to pGPU and the like). The other manner is to determine a resource demand of the application 150 by automatic estimation (such as deep learning). The collected resource demand can be converted into a corresponding resource allocation request, which can be transmitted 410 to the controller 140.

In response to receiving the resource allocation requests, the controller 140 can allocate corresponding vGPUs to the application 150. In some embodiments, in response to receiving the resource allocation request, the controller 140 can acquire the mapping table that records the mapping between pGPUs and vGPUs as shown in Table 1. For example, the controller 140 can acquire the mapping table locally or from another storage or a database that stores the mapping table, etc. In addition, the controller 140 can determine a current allocation status of a vGPU. The controller 140 can determine, based on the acquired mapping table and the determined allocation status of vGPU, the amount (also known as "a first amount" in the text) of vGPUs to be allocated to the application 150. For example, the controller 140 can determine the amount (also known as "a second amount" in the text) of vGPUs that are currently in the "allocable status" within the system and determine, from the second amount of vGPUs, the first amount of vGPUs to be allocated to the application 150.

In some embodiments, the controller 140 can allocate vGPUs to the application 150 based a variety of factors, which include but are not limited to: power consumption of vGPUs, locality of vGPUs (such as, whether belonging to the same server or whether being located at a server at a close proximity and the like), and network topology etc.

In some embodiments, the controller 140 can allocate vGPUs to the application 150 based on predetermined strategies. Several examples of the predetermined strategies will be further described below. It should be understood that the controller 140 also can allocate vGPU to the application 150 based on other strategies apart from the examples described below, and the scope of the present disclosure is not restricted in this regard.

In some embodiments, for example, the controller 140 can allocate, to the application 150, vGPUs from a same pGPU or a same server as much as possible, which makes the allocation of vGPUs meet the locality principle, thereby avoiding the same application from utilizing the GPU resources across a plurality of servers. This strategy is also known as a "bin-pack strategy." To follow this strategy, the controller 140 can firstly determine whether there are vGPUs from the same server to satisfy the needs of the application 150. If yes, the controller 140 can allocate the required vGPUs to the application 150 from this server only. If not, the controller 140 may try to allocate the required vGPUs to the application 150 across a plurality of servers. Additionally or alternatively, if there are vGPUs from the same server to satisfy the needs of the application 150, the controller 140 can further determine whether there are vGPUs from a same pGPU on the server to satisfy the needs of the application 150. If yes, the controller 140 can allocate the required vGPUs to the application 150 from this pGPU only. Otherwise, the controller 140 can allocate the required vGPUs to the application 150 from a plurality of pGPUs in the server.

In some other embodiments, for example, in order to avoid a specific pGPU becoming a system bottleneck as a result of being too busy, the controller 140 can allocate required vGPUs to the application 150 from a plurality of pGPUs in a balanced manner. This strategy is also known as a "balanced strategy."

Additionally or alternatively, in some embodiments, the controller 140 can allocate the vGPUs based on a combination of the above two strategies. For example, the allocated vGPU should generally be mapped to a plurality of pGPUs as uniform as possible for different applications, so as to avoid a specific pGPU becoming a system bottleneck as a result of being too busy. Meanwhile, the allocated vGPUs for the same application should be concentrated on the same pGPU or as less pGPUs as possible, so as to facilitate the aggregation of vGPUs and avoid utilizing the GPU resources across a plurality of servers or pGPUs. For example, if the application 150 requests 4 vGPUs and no single pGPU can provide 4 vGPUs, the controller 140 can allocate the 4 vGPUs respectively from two pGPUs. For example, the controller 140 can allocate 2 vGPUs from one pGPU and 2 vGPUs from another pGPU. In some embodiments, a plurality of vGPUs from the same pGPU can be aggregated into a bigger vGPU for allocating to the application. For example, the above 4 vGPUs can be aggregated into 2 bigger vGPUs to provide indications for the application.

Further, in some embodiments, the controller 140 can estimate execution efficiencies of the application 150 on different pGPUs, and allocate the vGPUs to the application 150 based on the result of the estimation. For example, the controller 140 can execute the above estimation based on a machine learning algorithm. To ensure service quality, the machine learning algorithm, for example, can be embedded in the controller 140.

Based on the above various factors and/or the predetermined allocation strategies, the controller 140 can generate a resource list including the allocated vGPUs (420). The controller 140 can return 430 the resource list to the client 120. In some embodiments, the resource list can be indicated in different ways. It is assumed that the controller 140 allocates 4 vGPUs to the application 150, which are respectively denoted as vGPU1, vGPU2, vGPU3 and vGPU4. vGPU1 and vGPU2, for example, come from the pGPU 160-1 in the server 110-1 as shown by FIG. 2, while vGPU3 and vGPU4, for example, come from the pGPU 160-3 of the server 110-2 as shown by FIG. 2. In some embodiments, the controller 140 can indicate 4 vGPUs in a way as shown in the following Table 2, where each entry in the resource list includes an index of the corresponding vGPU, an index of the pGPU to which the vGPU belongs and an identifier of the server in which the pGPU is located. This approach is complied with behavior habits of the user, such that the user can use a vGPU like using a pGPU, and this approach is completely compatible with the existing application. In addition, this approach conceals details of the mapping between vGPUs and pGPUs without requiring aggregation of vGPUs.

TABLE 2

Example resource list returned to client vGPU1, server 110-1, pGPU 160-1
vGPU2, server 110-1, pGPU 160-1
vGPU3, server 110-2, pGPU 160-3
vGPU4, server 110-2, pGPU 160-3

In some further embodiments, the controller 140 can aggregate a plurality of vGPUs from the same pGPU into a bigger vGPU and indicate the allocated vGPU using a resource percentage of the bigger vGPU relative to the pGPU as shown in the following Table 3. This approach exposes the performance of pGPUs, which makes it easier to be compatible with a third-party controller.

TABLE 3

Example resource list returned to client server 110-1, pGPU 160-1, 50%
server 110-2, pGPU 160-3, 30%

In response to receiving an indication related to the allocated vGPUs, the client 120 can request to connect 440 a corresponding server (e.g., servers 110-1 and 110-2 in the above examples), to access the corresponding GPU resources provided by the server to accelerate the application 150. In some embodiments, the client 120 can connect, dependent on the network that interconnects the client 120 with the server 110, to the server 110 via a suitable communication protocol (e.g., TCP or RDMA). For example, the GPU resources can be accessed at a particular Internet Protocol (IP) port of the server 110. Additionally or alternatively, information related to the amount of allocated GPU resources can be included in a connection request transmitted to the server.

In response to receiving a connection request from the client, the server 110 can process 450 the connection request, to provide corresponding GPU resources to the application on the client 120. Correspondingly, the server 110 can process subsequent GPU operation commands from the application. In addition, the server can perform, based on the information on the amount of GPU resources included in the connection request, a predetermined GPU resource (such as both computing resource and storage resource) restriction on the application, to realize a fair use of GPUs among different applications.

Moreover, related information on operating statuses of the system can be collected by the server 110 and provided to the controller 140. In some embodiments, the status information collected and provided by the server 110, for example, can include but are not limited to: GPU load and usage information (e.g., utilization rate of GPU cores, utilization rate of memory, power consumption, bus transmitting/receiving speed and the like), GPU load information (such as load information of the server driver etc.), and network load information etc. This information can be fed back 460 to the controller 140 for further analysis and display. Further, at least part of this information can influence the next round of allocation of vGPUs.

When the operation of the application 150 in the client 120 is completed, the corresponding vGPU can be released and this event can be notified to the controller 140 to update the status of vGPU. In some embodiments, the event can be notified to the server 110 by the client 120, and then the server 110 informs the controller 140. Alternatively, in some embodiments, the client 120 can directly inform the controller 140.

From the above description, it can be seen that the example embodiments of the present disclosure can implement scheduling of dedicated processing resources in a finer grain. This solution can realize flexible configuration and management of the logical dedicated processing resources by dividing the physical dedicated processing resources into logical dedicated processing resources and scheduling the logical dedicated processing resources.

Figure 5:
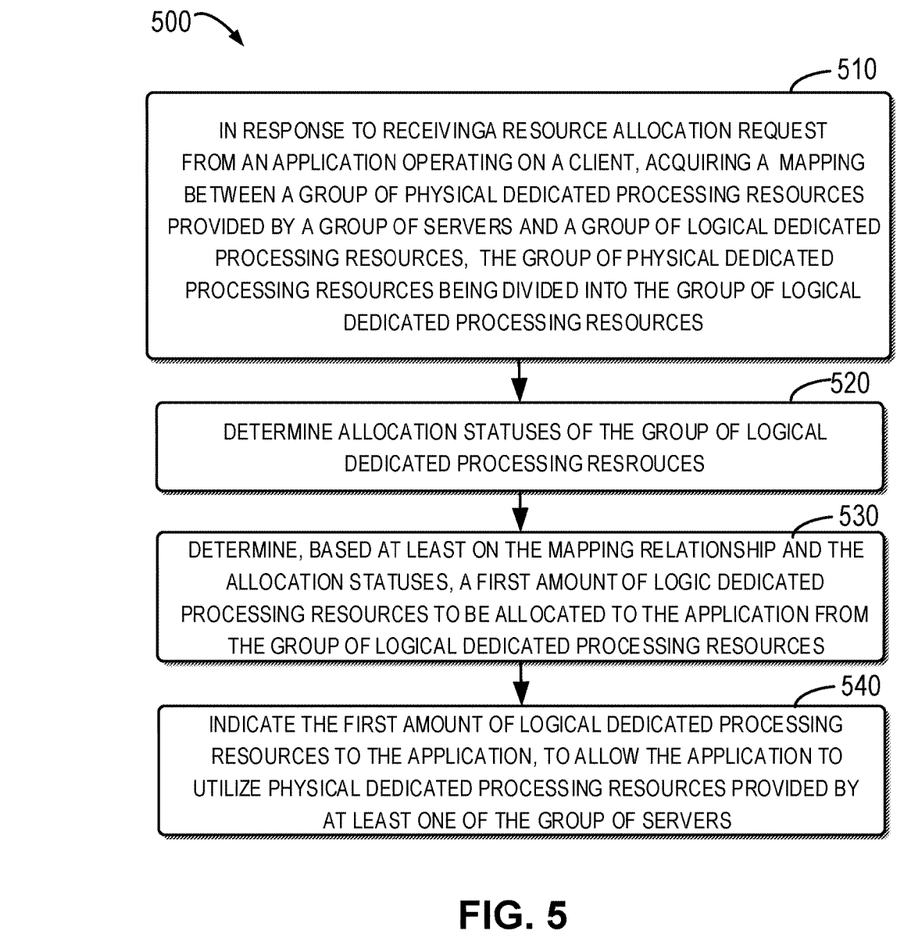
FIG. 5 illustrates a flowchart of a method for managing dedicated processing resources according to some embodiments of the present disclosure.

FIG. 5 illustrates a flowchart of a method 500 for managing dedicated processing resources according to some embodiments of the present disclosure. For example, the method 500 can be executed by the controller 140 as shown in FIG. 1, FIG. 2 and/or FIG. 4. It should be understood that the method 500 can also include additional actions not shown and/or omit some shown actions, and the scope of the present disclosure is not restricted in this regard.

At block 510, in response to receiving a resource allocation request from an application operating on a client, the controller 140 acquires a mapping between a group of physical dedicated processing resources provided by a group of servers and a group of logical dedicated processing resources divided from the group of physical dedicated processing resources. The resource allocation request indicates an amount of dedicated processing resources required by the application.

At block 520, the controller 140 determines allocation statuses of the group of logical dedicated processing resources.

At block 530, the controller 140 determines, based at least on the mapping and the allocation statuses, a first amount of logical dedicated processing resources to be allocated to the application from the group of logical dedicated processing resources, the first amount of logical dedicated processing resources meeting the amount of dedicated processing resources.

In some embodiments, the allocation statuses indicate a second amount of logical dedicated processing resources available for allocation in the group of logical dedicated processing resources. The controller 140 can determine, from the second amount of logical dedicated processing resources, the first amount of logical dedicated processing resources meeting the amount of dedicated processing resources.

In some embodiments, the controller 140 can determine the first amount of logical dedicated processing resources, such that the first amount of logical dedicated processing resources includes a plurality of logical dedicated processing resources mapped to a same physical dedicated processing resource in the group of physical dedicated processing resources.

In some embodiments, the controller 140 can determine the first amount of logical dedicated processing resources, such that the first amount of logical dedicated processing resources includes a plurality of logical dedicated processing resources provided by a same server in the group of servers.

In some embodiments, the controller 140 can determine the first amount of logical dedicated processing resources, such that the first amount of logical dedicated processing resources is uniformly mapped to the group of physical dedicated processing resources.

In some embodiments, the controller 140 can determine an estimate on execution efficiencies of the application over different physical dedicated processing resources, and determine, based on the estimate, the first amount of logical dedicated processing resources to be allocated to the application.

At block 540, the controller 140 indicates the first amount of logical dedicated processing resources to the application, to allow the application to utilize physical dedicated processing resources provided by at least one of the group of servers, the physical dedicated processing resources corresponding to the first amount of logical dedicated processing resources.

In some embodiments, the controller 140 can determine whether the first amount of logical dedicated processing resources include a plurality of logical dedicated processing resources mapped to the same physical dedicated processing resource. In response to determining that the first amount of logical dedicated processing resources includes a plurality of logical dedicated processing resources mapped to the same physical dedicated processing resource, the controller 140 can aggregate the plurality of logical dedicated processing resources into a single logical dedicated processing resource. The controller 140 can indicate the first amount of logical dedicated processing resources by indicating the single logical dedicated processing resource to the application.

In some embodiments, the controller 140 can also update, in response to the first amount of logical dedicated processing resources being indicated to the application, respective allocation statuses of the first amount of logical dedicated processing resources.

In some embodiments, one of the group of physical dedicated processing resources comprises at least one of a computing resources and a storage resource in a GPU.

Figure 6:
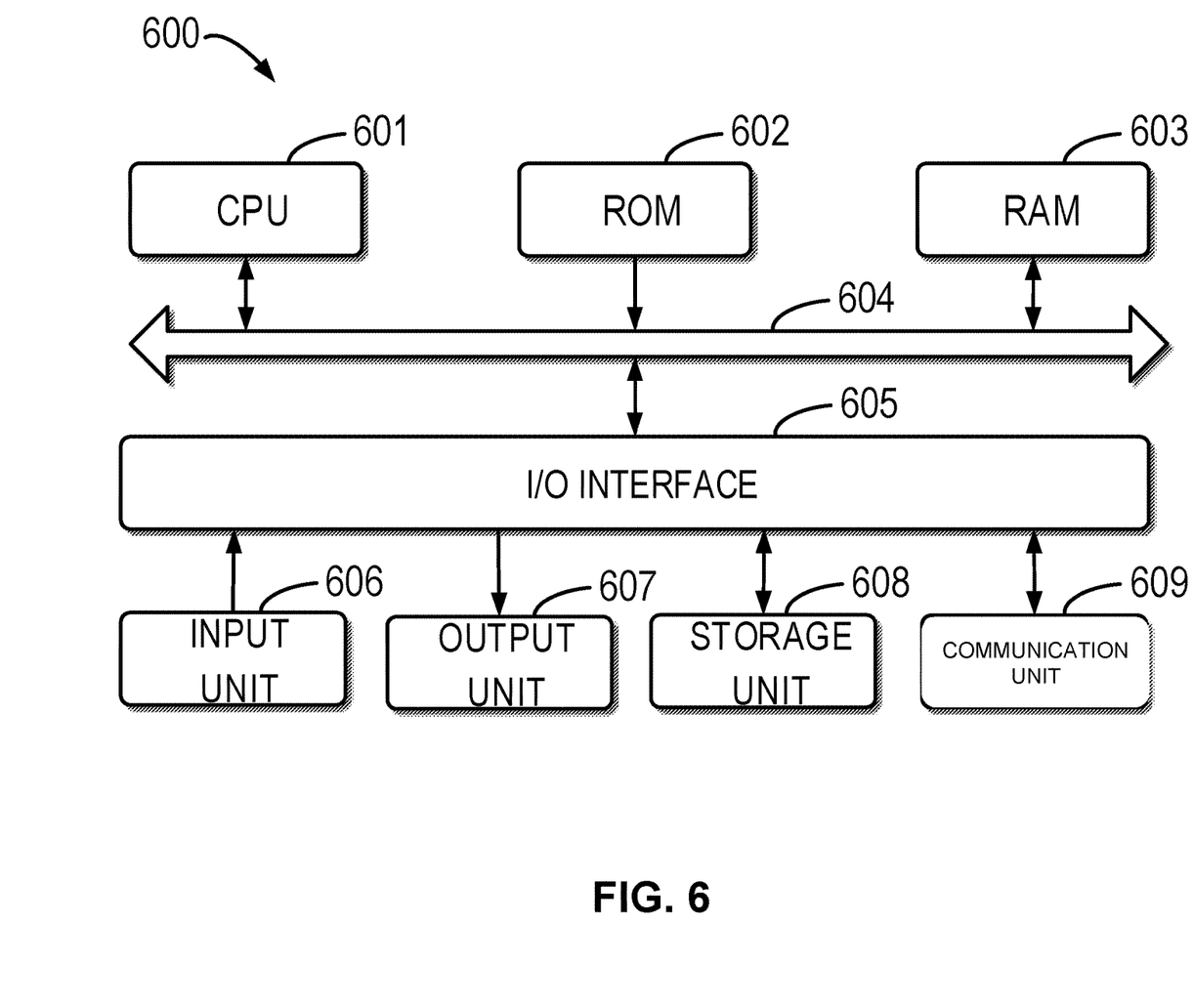
FIG. 6 illustrates a schematic block diagram of an example device for implementing embodiments of the present disclosure.

FIG. 6 illustrates a schematic block diagram of an example device 600 for implementing embodiments of the present disclosure. For example, the controller 140 as shown in FIG. 1, FIG. 2 and FIG. 4 can be implemented by the device 600. As shown, the device 600 includes a central process unit (CPU) 601, which can execute various suitable actions and processing based on the computer program instructions stored in the read-only memory (ROM) 602 or computer program instructions loaded in the random-access memory (RAM) 603 from a storage unit 608. The RAM 603 can also store all kinds of programs and data required by the operations of the device 600. CPU 601, ROM 602 and RAM 603 are connected to each other via a bus 604. The input/output (I/O) interface 605 is also connected to the bus 604.

A plurality of components in the device 600 is connected to the I/O interface 605, and the plurality of components include an input unit 606, such as keyboard, mouse and the like; an output unit 607, such as, various kinds of displays and loudspeakers etc.; a storage unit 608, such as disk, optical disk etc.; and a communication unit 609, such as network card, modem, wireless transceiver and the like. The communication unit 609 allows the device 600 to exchange information/data with other devices via the computer network, such as Internet, and/or various telecommunication networks.

Each of the procedures and processes, such as the method 500, described above can be executed by the processing unit 601. For example, in some embodiments, the method 500 can be implemented as computer software programs tangibly included in a machine-readable medium, e.g., the storage unit 608. In some embodiments, the computer program can be partially or fully loaded and/or mounted to the device 600 via ROM 602 and/or communication unit 609. When the computer program is loaded to RAM 603 and executed by the CPU 601, one or more actions in the above described method 500 can be implemented.

The present disclosure can be a method, a device and/or a computer program product. The computer program product can include a computer-readable storage medium, on which the computer-readable program instructions for executing various aspects of the present disclosure are loaded.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which comprises one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

logically partitioning, by a controller, a group of physical dedicated processing resources, which reside on a group of servers, into a group of logical dedicated processing resources, wherein at least one physical dedicated processing resource is logically partitioned into multiple logical dedicated processing resources to enable concurrent use of the at least one physical dedicated processing resource by a plurality of applications, and wherein at least one physical dedicated processing resource of the group of physical dedicated processing resources comprises a graphics processing unit (GPU) device comprising GPU compute and storage resources that are logically partitioned into a plurality of logical GPU compute and storage resources;

receiving, by the controller, a resource allocation request from a client driver operating on a client device, the resource allocation request indicating an amount of dedicated processing resources for allocating to an application executing on the client device;

in response to the resource allocation request, the controller performing a process comprising:

acquiring a mapping between the group of physical dedicated processing resources and the group of logical dedicated processing resources, wherein the mapping comprises at least one entry which maps at least one logical dedicated processing resource to at least one physical dedicated processing resource and which identifies a server of the group of servers on which the at least one physical dedicated processing resource resides;

determining allocation statuses of the group of logical dedicated processing resources;

determining, based at least on the mapping and the allocation statuses, a first amount of logical dedicated processing resources to be allocated to the application from the group of logical dedicated processing resources, the first amount of logical dedicated processing resources meeting the requested amount of dedicated processing resources;

indicating the first amount of logical dedicated processing resources to the client driver, to allow the client driver to communicate with at least one server of the group of servers to establish at least one data path between the client device and the at least one server of the group of servers and enable the application to utilize physical dedicated processing resources provided by the at least one server of the group of servers, the physical dedicated processing resources corresponding to the first amount of logical dedicated processing resources; and in response to receiving, by the controller, notification of completion of execution of the application and release of the first amount of logical dedicated processing resources, the controller updating the allocation statuses of the group of logical dedicated processing resources to indicate availability of the first amount of logical dedicated processing resources;

wherein the controller comprises at least one processing device comprising a processor coupled to a memory.

2. The method according to claim 1, wherein the allocation statuses indicate a second amount of logical dedicated processing resources available for allocation in the group of logical dedicated processing resources, and determining the first amount of logical dedicated processing resources comprises:

determining, from the second amount of logical dedicated processing resources, the first amount of logical dedicated processing resources meeting the amount of dedicated processing resources.

3. The method according to claim 1, wherein determining the first amount of logical dedicated processing resources comprises:

determining the first amount of logical dedicated processing resources, such that the first amount of logical dedicated processing resources include a plurality of logical dedicated processing resources mapped to a same physical dedicated processing resource in the group of physical dedicated processing resources.

4. The method of claim 1, wherein determining the first amount of logical dedicated processing resources comprises:

determining the first amount of logical dedicated processing resources, such that the first amount of logical dedicated processing resources include a plurality of logical dedicated processing resources provided by a same server in the group of servers.

5. The method of claim 1, wherein determining the first amount of logical dedicated processing resources comprises:

determining the first amount of logical dedicated processing resources, such that the first amount of logical dedicated processing resources is uniformly mapped to the group of physical dedicated processing resources.

6. The method of claim 1, wherein determining the first amount of logical dedicated processing resources comprises:

determining an estimate about execution efficiencies of the application over different physical dedicated processing resources; and determining, based on the estimate, the first amount of logical dedicated processing resources to be allocated to the application.

7. The method of claim 1, wherein indicating the first amount of logical dedicated processing resources to the application comprises:

determining whether the first amount of logical dedicated processing resources include a plurality of logical dedicated processing resources mapped to a same physical dedicated processing resource;

in response to determining that the first amount of logical dedicated processing resources include a plurality of logical dedicated processing resources mapped to a same physical dedicated processing resource, aggregating the plurality of logical dedicated processing resources into a single logical dedicated processing resource;

indicating the first amount of logical dedicated processing resources by indicating the single logical dedicated processing resource to the application.

8. The method of claim 1, further comprising:

in response to the first amount of logical dedicated processing resources being indicated to the application, updating respective allocation statuses of the first amount of logical dedicated processing resources.

9. The method of claim 1, further comprising the controller generating the mapping and storing the mapping in a storage device that is accessible by the controller.

10. A device, comprising:

at least one processing unit;

at least one memory coupled to the at least one processing unit and storing instructions executed by the at least one processing unit, the instructions, when executed by the at least one processing unit, causing the device to perform actions for managing resources, the actions comprising:

logically partitioning a group of physical dedicated processing resources, which reside on a group of servers, into a group of logical dedicated processing resources, wherein at least one physical dedicated processing resource is logically partitioned into multiple logical dedicated processing resources to enable concurrent use of the at least one physical dedicated processing resource by a plurality of applications, and wherein at least one physical dedicated processing resource of the group of physical dedicated processing resources comprises a graphics processing unit (GPU) device comprising GPU compute and storage resources that are logically partitioned into a plurality of logical GPU compute and storage resources;

receiving a resource allocation request from a client driver operating on a client device, the resource allocation request indicating an amount of dedicated processing resources for allocating to an application executing on the client device;

in response to the resource allocation request, performing a process which comprises:

acquiring a mapping between the group of physical dedicated processing resources and the group of logical dedicated processing resources, wherein the mapping comprises at least one entry which maps at least one logical dedicated processing resource to at least one physical dedicated processing resource and which identifies a server of the group of servers on which the at least one physical dedicated processing resource resides;

determining allocation statuses of the group of logical dedicated processing resources;

determining, based at least on the mapping and the allocation statuses, a first amount of logical dedicated processing resources to be allocated to the application from the group of logical dedicated processing resources, the first amount of logical dedicated processing resources meeting the requested amount of dedicated processing resources;

indicating the first amount of logical dedicated processing resources to the client driver, to allow the client driver to communicate with at least one server of the group of servers to establish at least one data path between the client device and the at least one server of the group of servers and enable the application to utilize physical dedicated processing resources provided by the at least one server of the group of servers, the physical dedicated processing resources corresponding to the first amount of logical dedicated processing resources; and in response to receiving notification of completion of execution of the application and release of the first amount of logical dedicated processing resources, updating the allocation statuses of the group of logical dedicated processing resources to indicate availability of the first amount of logical dedicated processing resources.

11. The device of claim 10, wherein the allocation statuses indicate a second amount of logical dedicated processing resources available for allocation in the group of logical dedicated processing resources, and determining the first amount of logical dedicated processing resources comprises:

determining, from the second amount of logical dedicated processing resources, the first amount of logical dedicated processing resources meeting the amount of dedicated processing resources.

12. The device of claim 10, wherein determining the first amount of logical dedicated processing resources comprises:

determining the first amount of logical dedicated processing resources, such that the first amount of logical dedicated processing resources include a plurality of logical dedicated processing resources mapped to a same physical dedicated processing resource in the group of physical dedicated processing resources.

13. The device of claim 10, wherein determining the first amount of logical dedicated processing resources comprises:

determining the first amount of logical dedicated processing resources, such that the first amount of logical dedicated processing resources include a plurality of logical dedicated processing resources provided by a same server in the group of servers.

14. The device of claim 10, wherein determining the first amount of logical dedicated processing resources comprises:

determining the first amount of logical dedicated processing resources, such that the first amount of logical dedicated processing resources is uniformly mapped to the group of physical dedicated processing resources.

15. The device of claim 10, wherein determining the first amount of logical dedicated processing resources comprises:

determining an estimate about execution efficiencies of the application over different physical dedicated processing resources; and determining, based on the estimate, the first amount of logical dedicated processing resources to be allocated to the application.

16. The device of claim 10, wherein indicating the first amount of logical dedicated processing resources to the application comprises:

determining whether the first amount of logical dedicated processing resources include a plurality of logical dedicated processing resources mapped to a same physical dedicated processing resource;

in response to determining that the first amount of logical dedicated processing resources include a plurality of logical dedicated processing resources mapped to a same physical dedicated processing resource, aggregating the plurality of logical dedicated processing resources into a single logical dedicated processing resource; and indicating the first amount of logical dedicated processing resources by indicating the single logical dedicated processing resource to the application.

17. The device of claim 10, wherein the actions further comprise:

in response to the first amount of logical dedicated processing resources being indicated to the application, updating respective allocation statuses of the first amount of logical dedicated processing resources.

18. A computer program product tangibly stored on a non-transitory computer storage medium and including machine-executable instructions, the machine-executable instructions, when executed by a device, causing the device to perform a method for managing resources, comprising:

logically partitioning a group of physical dedicated processing resources, which reside on a group of servers, into a group of logical dedicated processing resources, wherein at least one physical dedicated processing resource is logically partitioned into multiple logical dedicated processing resources to enable concurrent use of the at least one physical dedicated processing resource by a plurality of applications, and wherein at least one physical dedicated processing resource of the group of physical dedicated processing resources comprises a graphics processing unit (GPU) device comprising GPU compute and storage resources that are logically partitioned into a plurality of logical GPU compute and storage resources;

receiving a resource allocation request from a client driver operating on a client device, the resource allocation request indicating an amount of dedicated processing resources for allocating to an application executing on the client device;

in response to the resource allocation request, performing a process which comprises:

acquiring a mapping between the group of physical dedicated processing resources and the group of logical dedicated processing resources, wherein the mapping comprises at least one entry which maps at least one logical dedicated processing resource to at least one physical dedicated processing resource and which identifies a server of the group of servers on which the at least one physical dedicated processing resource resides;

determining allocation statuses of the group of logical dedicated processing resources;

determining, based at least on the mapping and the allocation statuses, a first amount of logical dedicated processing resources to be allocated to the application from the group of logical dedicated processing resources, the first amount of logical dedicated processing resources meeting the requested amount of dedicated processing resources;

indicating the first amount of logical dedicated processing resources to the client driver, to allow the client driver to communicate with at least one server of the group of servers to establish at least one data path between the client device and the at least one server of the group of servers and enable the application to utilize physical dedicated processing resources provided by the at least one server of the group of servers, the physical dedicated processing resources corresponding to the first amount of logical dedicated processing resources; and in response to receiving notification of completion of execution of the application and release of the first amount of logical dedicated processing resources, updating the allocation statuses of the group of logical dedicated processing resources to indicate availability of the first amount of logical dedicated processing resources.

19. The computer program product according to claim 18, wherein the allocation statuses indicate a second amount of logical dedicated processing resources available for allocation in the group of logical dedicated processing resources, and determining the first amount of logical dedicated processing resources comprises:

determining, from the second amount of logical dedicated processing resources, the first amount of logical dedicated processing resources meeting the amount of dedicated processing resources.

20. The computer program product according to claim 18, wherein determining the first amount of logical dedicated processing resources comprises at least one of:

determining the first amount of logical dedicated processing resources, such that the first amount of logical dedicated processing resources include a plurality of logical dedicated processing resources mapped to a same physical dedicated processing resource in the group of physical dedicated processing resources;

determining the first amount of logical dedicated processing resources, such that the first amount of logical dedicated processing resources include a plurality of logical dedicated processing resources provided by a same server in the group of servers;

determining the first amount of logical dedicated processing resources, such that the first amount of logical dedicated processing resources is uniformly mapped to the group of physical dedicated processing resources; and  determining an estimate about execution efficiencies of the application over different physical dedicated processing resources, and determining, based on the estimate, the first amount of logical dedicated processing resources to be allocated to the application.

\* \* \* \* \*